US012523098B2

(12) United States Patent
Ballweg

(10) Patent No.: US 12,523,098 B2
(45) Date of Patent: Jan. 13, 2026

(54) LADDER TOP FOR A STRAIGHT OR EXTENSION LADDER

(71) Applicant: Ryan S. Ballweg, Sun Prairie, WI (US)

(72) Inventor: Ryan S. Ballweg, Sun Prairie, WI (US)

( * ) Notice: Subject to any disclaimer, the term of this patent is extended or adjusted under 35 U.S.C. 154(b) by 432 days.

(21) Appl. No.: 18/205,361

(22) Filed: Jun. 2, 2023

(65) Prior Publication Data

US 2024/0401410 A1 Dec. 5, 2024

(51) Int. Cl.
*E06C 7/48* (2006.01)
*E06C 7/14* (2006.01)

(52) U.S. Cl.
CPC ................ *E06C 7/482* (2013.01); *E06C 7/14* (2013.01)

(58) Field of Classification Search
CPC ..... B25H 3/06; E06C 7/14; E06C 7/48; E06C 7/482
See application file for complete search history.

(56) References Cited

U.S. PATENT DOCUMENTS

| | | | | |
|---|---|---|---|---|
| 5,460,241 A * | 10/1995 | LaBelle | E06C 7/16 182/121 |
| 6,565,051 B2 * | 5/2003 | Vaglica | E06C 7/14 248/210 |
| 7,063,187 B1 * | 6/2006 | Lavigne | E06C 1/39 248/238 |
| D549,356 S | 8/2007 | Gibson | |
| 7,753,170 B1 * | 7/2010 | Gibson | E06C 7/482 248/210 |
| 8,157,055 B2 * | 4/2012 | Stark | E06C 7/14 182/129 |
| 8,881,917 B1 * | 11/2014 | Sooknanan | E04G 5/003 248/238 |
| D835,807 S | 12/2018 | Lentine et al. | |
| 10,590,703 B2 | 3/2020 | Parker et al. | |
| D899,628 S | 10/2020 | Moncada | |
| D905,869 S | 12/2020 | Lentine et al. | |
| D912,847 S | 3/2021 | Maxfield et al. | |

(Continued)

FOREIGN PATENT DOCUMENTS

| | | | |
|---|---|---|---|
| AU | 6205596 A * | 2/1997 | E06C 7/482 |
| DE | 102013220195 A1 * | 4/2015 | E06C 7/14 |

(Continued)

OTHER PUBLICATIONS

"Ladder Standoff and Tool Tray," Telesteps Engineered Climbing, Screen shots of https://telestepsladders.com/products/ladder-standoff-and-tool-tray, downloaded Jun. 2, 2023.

*Primary Examiner* — Colleen M Chavchavadze
(74) *Attorney, Agent, or Firm* — Stiennon & Stiennon

(57) ABSTRACT

A ladder top can be releasably attached to various straight ladders or the fly parts of extension ladders. The ladder top is configured to engage against a flat wall on one side, and against exterior corners or other structures on the opposite side. The ladder top has a top wall with two spaced shells which have downwardly opening pockets which receive the rails of the ladder. One or more keeper pins extend through holes in the shells to reduce the effective dimensions of the pockets accommodating ladder rails with or without bumper tops. Flanges on either or both sides of the shells have openings allowing bungee cords, wires, or cord to hold the ladder top to the ladder by engaging the ladder rung to the top.

15 Claims, 3 Drawing Sheets

(56) References Cited

U.S. PATENT DOCUMENTS

| | | | | |
|---|---|---|---|---|
| D912,848 | S | 3/2021 | Maxfield et al. | |
| D935,053 | S | 11/2021 | Lentine et al. | |
| 11,187,039 | B2 | 11/2021 | Moreno Moncada | |
| 11,828,107 | B1 * | 11/2023 | Warunek | E06C 7/48 |
| 11,913,283 | B2 * | 2/2024 | MacKarvich | E06C 7/48 |
| 2008/0017447 | A1 | 1/2008 | Sheridan et al. | |
| 2008/0083583 | A1 | 4/2008 | Gibson | |
| 2018/0187488 | A1 * | 7/2018 | Mora | E06C 1/04 |
| 2019/0218860 | A1 * | 7/2019 | Seabold | E06C 7/46 |
| 2020/0232280 | A1 | 7/2020 | Mora et al. | |
| 2023/0167684 | A1 * | 6/2023 | Armenoff | E06C 7/143<br>248/210 |

FOREIGN PATENT DOCUMENTS

| | | | | | |
|---|---|---|---|---|---|
| GB | 2012341 | A | * | 7/1979 | E06C 7/48 |
| GB | 2371078 | A | * | 7/2002 | E06C 7/14 |
| GB | 2385879 | A | * | 9/2003 | E06C 7/48 |

* cited by examiner

LADDER TOP FOR A STRAIGHT OR EXTENSION LADDER

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a top for a ladder either a straight ladder or an extension ladder. These types of ladder have two rails joined by rungs which form steps by which the ladder is ascended. The upper termination or top of the ladder comprises ladder rails which extend a short distance beyond the last ladder rung. A ladder top typically has a short platform which receives the ladder rails which terminate the upper end of the ladder. The short platform typically performs two or more functions including providing a place to hold tools, a place to hold fasteners like screws or to hold bits such as drill bits or screw bits in a recessed tray or a feature with a magnetic retainer. Another common function is to facilitate holding the ladder top for greater stability. Stabilizing features include having the ladder top shaped to engage standard dimensioned lumber such as a 2×4, 2×6, 2×8 or to engage an inside corner of a building or building framing. The ladder top may also have a resilient surface, for example rubber or plastic, to engage a wall or surface which the ladder is leaned against to facilitate gripping or to prevent marking of the wall or surface.

There are, however, a wide variety of ladders, for various uses. What is needed is an accessory ladder top which can be readily and securely mounted to different straight or extension ladders.

SUMMARY OF THE INVENTION

A ladder top has two sidewardly spaced shells which define downwardly opening pockets or sleeves for receiving the tops of the side rails of a straight ladder or the fly part of an extension ladder. The ladder top shells have adjustable features which position the ladder rails within the pockets to better engage the ladder rails or to capture the rails within the pockets. The adjustable features can be one or more keeper pins which pass through holes in the sides of the shells to reduce the effective dimensions of the pockets for a more secure engagement of the ladder side rails. To hold the ladder top to the upper end of the ladder, the ladder top has flanges on either or both sides of the shells with portions which form openings which allow bungee cords, wires, or cord to hold the ladder top to the ladder by engaging a ladder rung or other structures of the ladder to fix the ladder top to the ladder. The upper surface of the ladder top has two recessed portions lined with magnets to hold fasteners, bits, or sockets which are placed therein. The upper surface of the ladder top has portions forming holes for holding drills or drivers or hardware. The upper surface of the ladder top has side edges with a laminated rubber surface designed for high friction having bars and alternating grooves which are angled at 45 degrees. The upper surface side edges form a straight surface for engaging a planer wall. The straight surface terminates at either end in a 45 degree corner for engaging an inside corner of a building or structure. The side edge opposite the straight surface has a centered right-angle indentation for engaging an outside corner of a building or structure. On either side of the centered right-angle indentation are evenly spaced steps for engaging dimensioned lumber of 6, 8, or 10 inch nominal width.

It is an object of the present invention to provide an accessory for releasable attachment to a ladder which can accommodate ladder rails with and without bumpers.

It is a further object of the present invention to provide an accessory for attachment to ladders which can be positioned in different positions to best suit the shape of the structure against which the ladder is intended to be supported. Further objects, features and advantages of the invention will be apparent from the following detailed description when taken in conjunction with the accompanying drawings.

DESCRIPTION OF THE PREFERRED EMBODIMENTS

Figure 1:
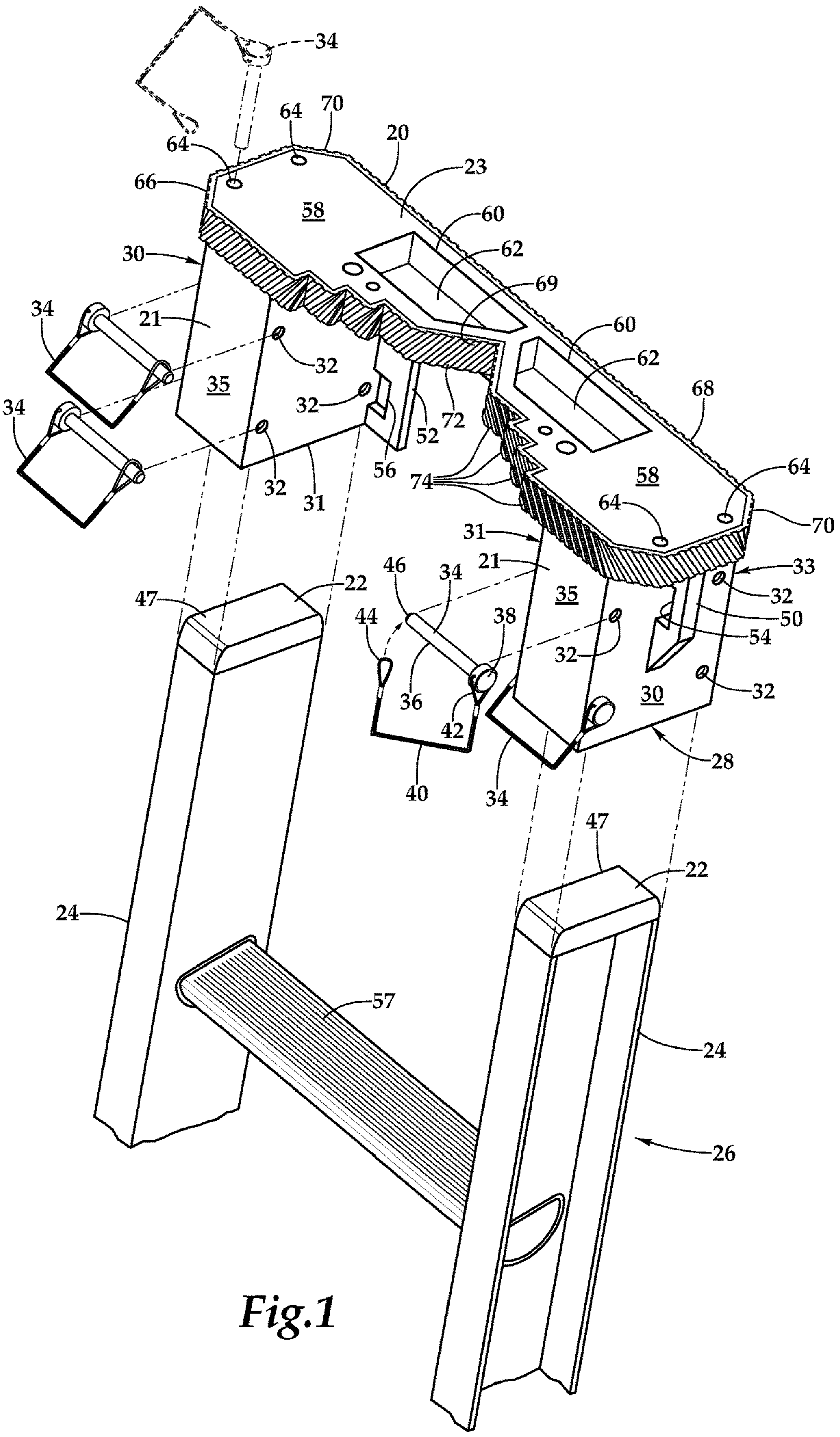
FIG. 1 is an isometric view of the ladder top shown exploded away from the side rail of a ladder to which it can be mated.

Referring more particularly to FIGS. 1-6, wherein like numbers refer to similar parts, a ladder top 20 of the invention is shown in FIG. 1. The ladder top 20 fits on the upwardly projecting ends 22 of the side rails 24 of a ladder 26 which can be a straight ladder or the fly part of an extension ladder. The ladder top 20 has two side shells 21 which extend downwardly from a top wall 23 which rigidly connects the two shells. Each shell 21 has an outside wall 30 and an inside wall 31 which are connected by a first wall 33 and a second wall 35. Together, the shell walls 30, 31,33, 35 define with the top wall 23 two downwardly opening pockets 28 which receive the ends 22 of the ladder 26 as shown in FIG. 1.

Figure 2:
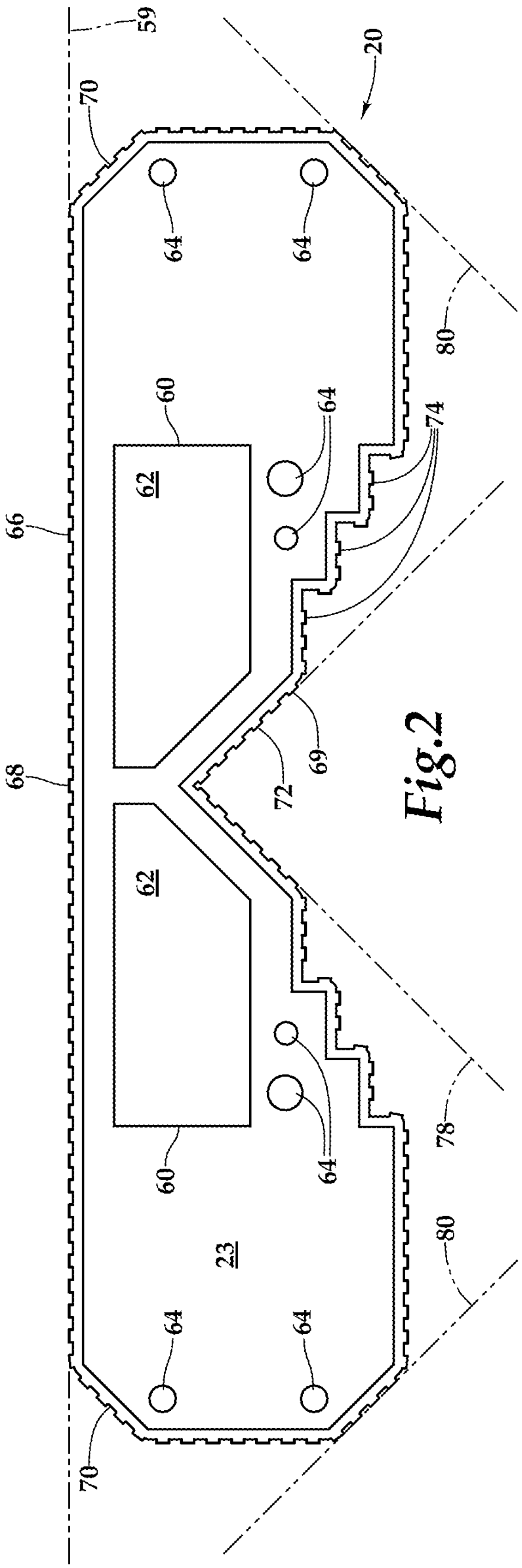
FIG. 2 is a top plan view of the ladder top of FIG. 1.
Figure 3:
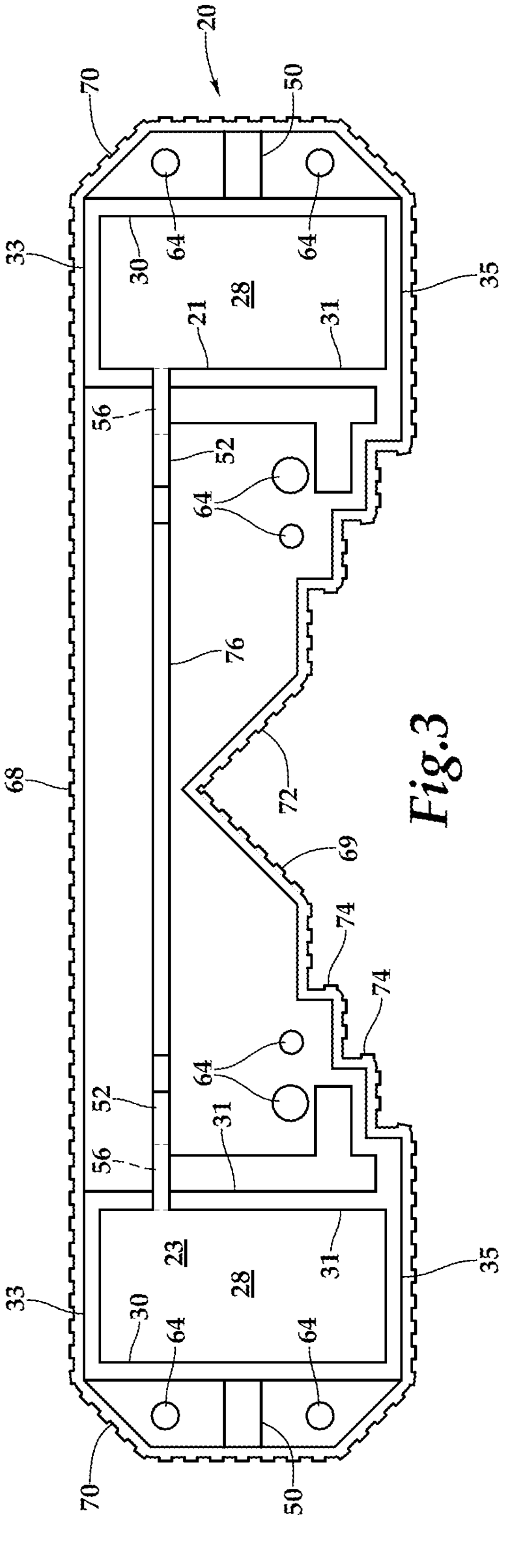
FIG. 3 is a bottom plan view of the ladder top of FIG. 1.
Figure 5:
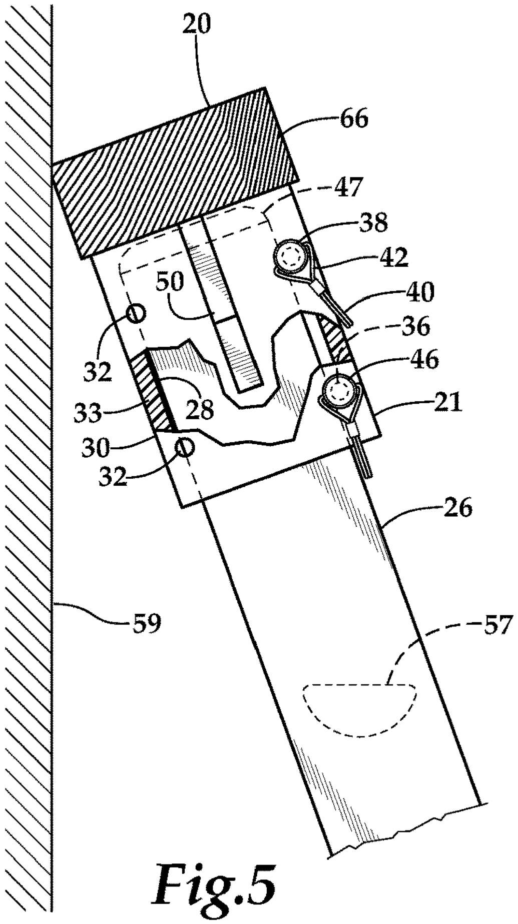
FIG. 5 is a side elevational view of the ladder top of FIG. 1 installed on a ladder with an upper cap, partially cut away in section view.

The top 20 is a removable accessory for conventional ladders, allowing a user to supply additional features to give added functionality to the ladder. The upper surface 58 of the ladder top 20, as shown in FIGS. 1 and 2, has two recessed portions 60 or compartments, which may be lined with magnets 62 to hold fasteners, bits, or sockets when placed therein. The top wall 23 of the ladder top 20 has portions forming through holes 64 opening on the upper surface 58 which provide storage for holding drills or drivers or hardware. The top wall 23 of the top 20 has outer side edges 66 surrounding and extending below the upper surface 58 about one inch. The outer side edges 66 are preferably covered by a laminated rubber surface designed for high friction having protruding bars and alternating grooves which are angled at 45 degrees. A flat surface engaging side 68 of the top wall side edges 66 form a straight surface for engaging a planer wall 59 such as shown in FIGS. 2 and 5. As shown in FIG. 3, the flat surface engaging side 68 terminates at either end in 45 degree corners 70 for engaging an inside corner 80 of a building or structure. A corner-engaging side 69 of the top wall side edges 66 is formed opposite the side 68, and has a centered right-angle indentation 72 for engaging an outside corner 78 of a building or structure as shown in FIG. 2. Adjacent the centered right-angle indentation 72 are evenly spaced steps 74 for engaging dimension lumber of 6, 8, or 10 inch nominal width. The user of the top 20 may adjust how the top is mounted to the ladder to best serve the particular task at hand: supporting the ladder against a flat surface or a corner or dimensioned timber.

Figure 6:
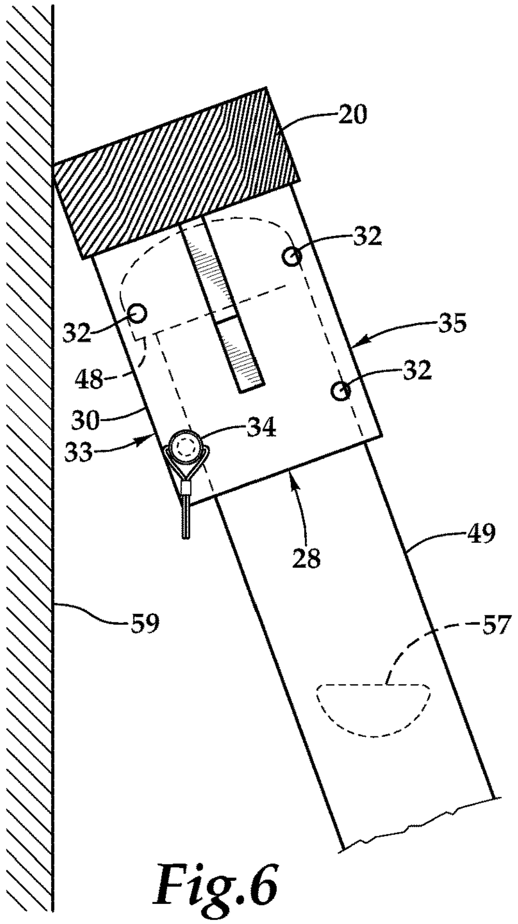
FIG. 6 is a side elevational view of the ladder top of FIG. 1 installed on a ladder with a bumper cap, shown in fragmentary view.

As shown in FIGS. 1, 5 and 6, each shell inside wall 31 and outside wall 30 has four holes 32 which are configured to accept keeper pins 34 which serve as shims to limit the movement of the ladder top 20 with respect to the ladder side rails. The holes 32 in each inside wall are aligned with the holes of the corresponding shell outside wall to allow the shafts 36 of the keeper pins to extend through the pocket 28 close to the first or second walls 33, 35. The keeper pins 34, as best shown in FIG. 1, have a head 38 on one end of the pin shaft 36 to which is pivotally mounted a C shaped bail 40. One end of the C shaped bail 40 has a first loop 42 which passes through a hole in the pin shaft head 38 allowing pivoting so that a second loop 44 of the C shaped bail can, with flexing of the C shaped bail, encircle a second end 46 of the pin shaft 36 opposite the pin shaft head 38. Flexing of the bail 40 allows the second loop 44 to encircle the second end 46 of the pin shaft 36 where relaxation of the bail holds the second loop in place on the shaft second end, thereby locking the pin shaft in place within the holes 32 of the pocket shell 21.

The top 20 may be employed with a variety of conventional ladders. Some ladders 26 have a narrow end cap 47, such as shown in FIGS. 1 and 5, which terminates the ladder rail 24 and defines the end 22 of the ladder rail and which does not protrude substantially beyond the rail 24. Other ladders 49, such as the one shown in FIG. 6, have side rails 24 which are terminated by bumpers 48 which protrude frontwardly from the rails. The top 20 is configured to allow it to be readily employed with either type of ladder 26, 49 in a fashion which allows restricted shifting of the top with respect to the ladder rails, thereby offering a more secure connection. The keeper pins 34 serve as removable shims which position the ladder side rails 24 within the pockets 28 to better engage the ladder rails 24 as shown in FIG. 5 or to capture the rails within the pockets as shown in FIG. 6.

When it is desired to attach the ladder top 20 to a ladder 26 with a narrow end cap 27 without a bumper, as shown in FIG. 5, two keeper pins 34 are inserted through aligned holes 32 in the shell inside and outside walls 31, 30 of each shell 21 in the holes on the side of the shell away from the surface 59 against which the ladder is to be supported. The ladder rail ends 22 engage against the underside of the top 20 top wall 23, and the keeper pins 34 serve as shims which reduce the range of movement of the ladder rails within the pockets. 28.

Alternatively, as shown in FIG. 6, when the top 20 is positioned on a ladder 49 with bumpers 48 on the rails, a single keeper pin 34 is inserted through the lower holes 32 in the inner and outer walls of the shells adjacent the walls of each shell which will face the surface 59 against which the ladder will be positioned. It will be noted that when used with this type of ladder 49, the keeper pins 34 capture the ends of the rails within the pockets. The single keeper pins in each shell restrict the top from pivoting with respect to the ladder 49 with the wider portions of the side rails defined by the bumpers 48. Thus the keeper pins 34 serve as an adjustable feature which pass through holes 32 in the sides walls 30, 31 of the shells 21 to reduce the effective dimensions of the pockets 28.

Figure 4:
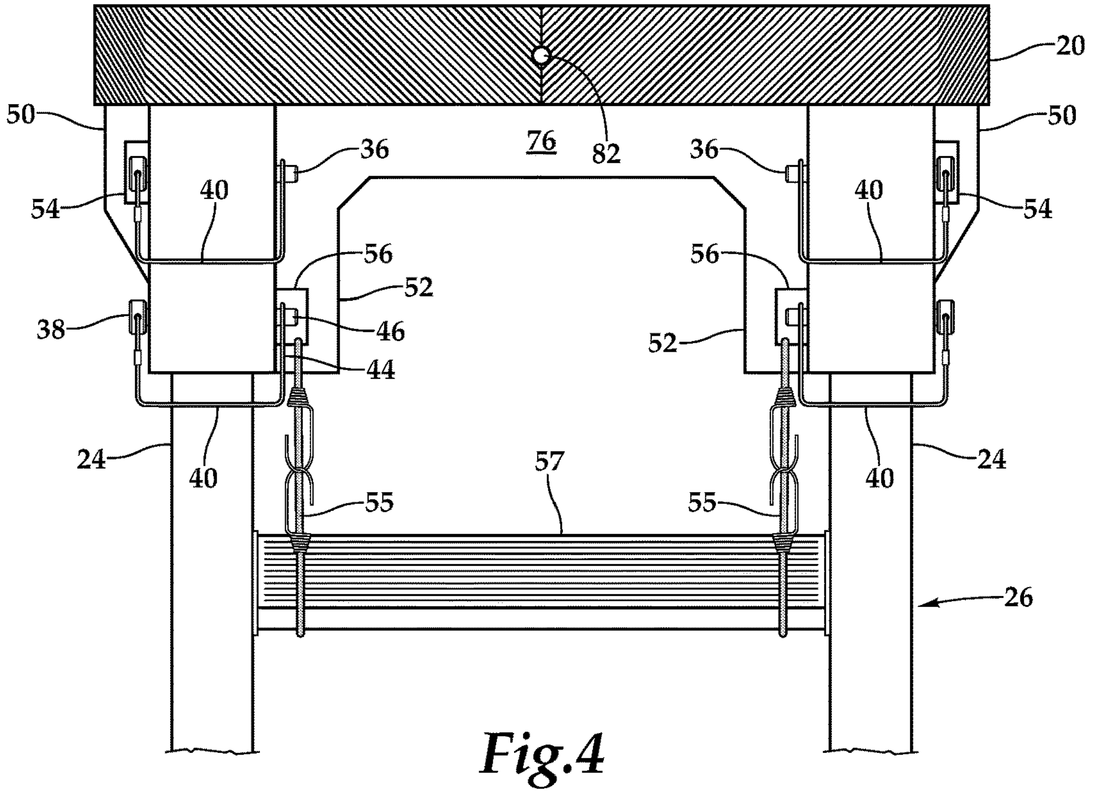
FIG. 4 is a front elevational view of the ladder top of FIG. 1 mated to the ladder shown in FIG. 1 attached to the ladder by bungee cords to the top rung of the ladder.

Although gravity will hold the ladder top 20 to the upper ends 22 of the ladder, it is desirable to secure it to retain it in place despite movement of the ladder. As shown in FIG. 4, resilient straps such as bungee cords 55 may be looped around an upper rung 57 of the ladder and through holes formed in flanges 50, 52 which project sidewardly of the shells 21. Each shell 21 has an outside flange 50 which defines a hole 54 and an inside flange 52 which defines a hole 56. The holes 54, 56 in the flanges accept the bungee cords 55, wires, or other fastener which loops around the ladder rung 57 or other structures to fix the ladder top 20 to the ladder. To further stiffen the ladder top 20, the inside flanges 52 may be continued with an inner stiffening flange 76 as shown in FIG. 4.

It should be observed that the ladder top 20 may be positioned either with the flat surface 68 or the corner-engaging side 69 facing towards the supporting vertically extending surface. When the user switches the ladder top 20 between one of the two orientations, it will be necessary to adjust the positioning of the keeper pins within the pin holes 32.

Because the ladder 20 requires fewer keeper pins 34 when used with a bumper cap ladder 49, a user may store the unused keeper pins within the holes 64 extending through the top wall of the ladder top 20, as shown in phantom exploded view in FIG. 1.

A screw hole 82, shown in FIG. 4, is provided in the top 20 which passes through the center of the right-angle indention 72, which allows the top and the ladder to which it is mounted to be secured with a screw to an exterior corner 78 of a structure.

It is understood that the invention is not limited to the particular construction and arrangement of parts herein illustrated and described, but embraces all such modified forms thereof as come within the scope of the following claims.

I claim:

1. A ladder top for mounting to the upwardly projecting rails of a ladder, the ladder top comprising:

a top wall;

a first shell extending downwardly from the top wall;

a second shell spaced sidewardly from the first shell and extending downwardly from the top wall, wherein each of the first shell and the second shell have an outer wall spaced sidewardly from an inner wall, and a front wall spaced frontwardly from a rear wall, and wherein a downwardly opening pocket is defined by each shell between the inner and outer wall and downward of the top wall, each shell being configured to receive an upper portion of a ladder rail therein;

portions of each shell inner wall which define four holes;

portions of each shell outer wall which define four holes which are aligned with the associated shell inner wall holes so as to receive a horizontal pin extending through the pocket between an aligned hole of the four holes on the inner wall and the outer wall of the shell; and at least one pin releasably extending through aligned holes in each of the two shells, the pins passing through one of the pockets and acting as shims to support the top on a ladder.

2. The ladder top of claim 1 wherein the four holes in each shell inner wall and each shell outer wall comprise two upper holes and two lower holes.

3. The ladder top of claim 1 wherein the at least one pin further comprises a bail which is releasably connected between a first end and a second end of the pin, such that the pin is retained within one of the shells.

4. The ladder top of claim 1 wherein the top wall has a perimeter edge which has a first side which is configured to engage a flat surface, and a second, opposite side which has a right angle indent which is configured to engage an outside corner of a structure.

5. A ladder top for mounting to the upwardly projecting rails of a ladder, the ladder top comprising:

a top wall having a perimeter edge which has a first side which is configured to engage a flat surface, and a second, opposite side which has a right angle indent which is configured to engage an outside corner of a structure;

a first shell extending downwardly from the top wall;

a second shell spaced sidewardly from the first shell and extending downwardly from the top wall, wherein each of the first shell and the second shell have an outer wall spaced sidewardly in a first direction from an inner wall, and a first wall spaced in a second direction from a second wall, wherein the second direction is perpendicular to the first direction, and wherein a downwardly opening pocket is defined by each shell between the inner and outer walls and downward of the top wall, each shell being configured to receive an upper portion of a ladder rail therein; and two first shims, wherein one of the two first shims is releasably mounted within each of the downwardly opening pockets of the first shell and the second shell, each first shim extending in the first direction, to thereby reduce the dimension in the second direction of the pocket within which it extends.

6. The ladder top of claim 5 wherein the first shell inner wall has portions which define a hole which is aligned with a hole in the first shell outer wall, and wherein the one of the two first shims is releasably mounted within the downwardly opening pocket of the first shell by extending through the aligned holes in the inner wall of the first shell and the outer wall of the first shell.

7. The ladder top of claim 6 wherein the first shims comprise keeper pins having a shaft with two ends and a releasable bail which engages both ends of the shaft.

8. The ladder top of claim 5 further comprising an inner flange extending in the first direction from the inner wall of the first shell, the inner flange having portions defining a through hole configured to receive a cord therethrough to allow the ladder top to be secured to a rung of a ladder to which it is mounted.

9. The ladder top of claim 5 further comprising an outer flange extending in the first direction from the outer wall of the first shell, the outer flange having portions defining a through hole configured to receive a cord therethrough to allow the ladder top to be secured to a rung of a ladder to which it is mounted.

10. The ladder top of claim 5 further comprising:

portions of the first shell inner wall defining four through holes, each of which communicates with an interior of the pocket of the first shell;

portions of the first shell outer wall defining four through holes which are aligned with a corresponding hole of the first shell inner wall along axes extending in the first direction; and wherein each first shim has portions which engage with corresponding holes in the first shell inner wall and outer wall.

11. The ladder top of claim 10 further comprising second shims, one extending within each of the pockets of the first shell and the second shell, the second shells being positioned above the first shims.

12. The ladder top of claim 10 further comprising a plurality of storage holes extending through the top wall in a vertical direction which is perpendicular to the first direction and the second direction, the storage holes being of a size to accommodate a portion of one of the first shims extending therethrough.

13. A ladder and ladder top assembly comprising:

a ladder having a first side rail joined by rungs to a second side rail, each side rail extending upwardly and being terminated by a bumper which projects frontwardly from the associated rail;

a ladder top comprising:

a top wall;

a first shell extending downwardly from the top wall and having a first inner wall spaced sidewardly from a first outer wall, wherein the first inner wall is connected to the first outer wall by a first front wall spaced frontwardly from a first rear wall, wherein the first shell defines a downwardly opening first pocket;

a second shell extending downwardly from the top wall and having a second inner wall spaced sidewardly from a second outer wall, wherein the second inner wall is connected to the second outer wall by a second front wall spaced frontwardly from a second rear wall, wherein the second shell defines a downwardly opening second pocket;

wherein the first rail extends within the first pocket and the second rail extends within the second pocket;

wherein each shell outer wall has portions forming at least one first hole configured to accept a shaft of a keeper pin and each shell inner wall has portions forming a second hole aligned with the first hole, and a keeper pin extends through the aligned first and second holes of each shell, the keeper pin shafts being positioned beneath the bumper of each rail within its respective pocket;

at least one flange extending from each shell and having an opening therein;

a flexible connector extending through the opening in the at least one flange and encircling one of the rungs of the ladder to secure the ladder top to the ladder; and at least two storage holes extending through the top wall, each storage hole receiving a shaft of a keeper pin therein for use in an alternative placement of the ladder top.

14. A ladder and ladder top assembly comprising:

a ladder having a first side rail joined by rungs to a second side rail, each side rail extending upwardly and being terminated by a bumper which projects frontwardly from the associated rail;

a ladder top comprising:

a top wall;

a first shell extending downwardly from the top wall and having a first inner wall spaced sidewardly from a first outer wall, wherein the first inner wall is connected to the first outer wall by a first front wall spaced frontwardly from a first rear wall, wherein the first shell defines a downwardly opening first pocket;

a second shell extending downwardly from the top wall and having a second inner wall spaced sidewardly from a second outer wall, wherein the second inner wall is connected to the second outer wall by a second front wall spaced frontwardly from a second rear wall, wherein the second shell defines a downwardly opening second pocket;

wherein the first rail extends within the first pocket and the second rail extends within the second pocket;

wherein each shell outer wall has portions forming at least one first hole configured to accept a shaft of a keeper pin and each shell inner wall has portions forming a second hole aligned with the first hole, and a keeper pin extends through the aligned first and second holes of each shell, the keeper pin shafts being positioned beneath the bumper of each rail within its respective pocket;

at least one flange extending from each shell and having an opening therein;

a flexible connector extending through the opening in the at least one flange and encircling one of the rungs of the ladder to secure the ladder top to the ladder; and wherein the at least one flange extending from each shell comprises an inner flange extending towards an opposite shell and an outer flange extending away from the opposite shell.

15. A ladder and ladder top assembly comprising:

a ladder having a first side rail joined by rungs to a second side rail, each side rail extending upwardly and being terminated by a bumper which projects frontwardly from the associated rail;

a ladder top comprising:

a top wall;

a first shell extending downwardly from the top wall and having a first inner wall spaced sidewardly from a first outer wall, wherein the first inner wall is connected to the first outer wall by a first front wall spaced frontwardly from a first rear wall, wherein the first shell defines a downwardly opening first pocket;

a second shell extending downwardly from the top wall and having a second inner wall spaced sidewardly from a second outer wall, wherein the second inner wall is connected to the second outer wall by a second front wall spaced frontwardly from a second rear wall, wherein the second shell defines a downwardly opening second pocket;

wherein the first rail extends within the first pocket and the second rail extends within the second pocket;

wherein each shell outer wall has portions forming at least one first hole configured to accept a shaft of a keeper pin and each shell inner wall has portions forming a second hole aligned with the first hole, and a keeper pin extends through the aligned first and second holes of each shell, the keeper pin shafts being positioned beneath the bumper of each rail within its respective pocket;

at least one flange extending from each shell and having an opening therein;

a flexible connector extending through the opening in the at least one flange and encircling one of the rungs of the ladder to secure the ladder top to the ladder; and wherein the ladder top has a first vertically extending surface which is configured for engagement against a planar supporting surface, and an opposite side of the ladder top has a second vertically extending surface which includes an indent for engagement against an outside corner of a structure, and wherein each shell outer wall of the ladder top has portions forming at least one first second hole configured to accept a shaft of a keeper pin and each shell inner wall has portions forming a second second hole aligned with the at least one first second hole, and a keeper pin extends through the aligned first second hole and second second hole of each shell, the keeper pin shafts being positioned beneath the bumper of each rail within its respective pocket.

* * * * *